Jan. 29, 1963     F. MINECK     3,075,787

AUTOMOTIVE FRONT SUSPENSION STABILIZER

Filed Sept. 25, 1961

INVENTOR.
FRED MINECK.
BY
Willard S. Grow
ATTORNEY.

United States Patent Office 3,075,787
Patented Jan. 29, 1963

3,075,787
AUTOMOTIVE FRONT SUSPENSION STABILIZER
Fred Mineck, 3101 W. Astor Drive, Westown,
Phoenix 23, Ariz.
Filed Sept. 25, 1961, Ser. No. 140,297
2 Claims. (Cl. 280—96.2)

This invention pertains to automotive front suspension stabilizers and is particularly directed to an upper ball joint stabilizer for the front suspension arms of an automobile.

One of the objects of this invention is to provide a stabilizer for a front end suspension which ties the upper and lower ball joints together under tension so as to keep the upper normally loose ball joint snug in its socket.

Another object of this invention is to provide a front end stabilizer which keeps both arms operating in unison.

Another object is to provide a front end stabilizer which adds strength to the lower suspension arm by putting tension on the opposite side of the lower arm from the front torsion bar connection point.

Another object is to provide a stabilizer between the arms of a front suspension system which has only one flex point at the lower end comprising a compression bushing of flexible plastic material.

A further object is to provide a front end stabilizer between the arms of a front end suspension having an upper hook and a connecting rod having no movement as it utilizes the pin and bushing of the suspension coil spring mount and shock absorber mount that moves in straight vertical up and down motion.

And another object is to provide a stabilizer which keeps tension on the uper arm spring saddle to keep the pivotal connection between the upper arm and spring saddle free from rattles when wear occurs in said pivotal connection.

Another object of this invention is to provide a stabilizer as recited above having a lower eyelet bolt utilizing a special hook bracket that locks on the edge of the lower suspension arm and in which the lower eyelet bolt utilizes the existing channel of the lower arm as a guide only.

Another object of this invention is to provide a stabilizer for a front end suspension which keeps the ball joints tight and also stops movement in the joints when brakes are applied and torque is dissipated to the frame.

And a further object is to provide a front end stabilizer of simple construction and easy to install without having to dismantle the existing front end suspension parts.

And finally it is an object of this invention to utilize any form of tension devices such as springs, rubber plastic materials and the like.

Further features and advantages of this invention will appear from a detailed description of the drawings in which.

Figure 1:
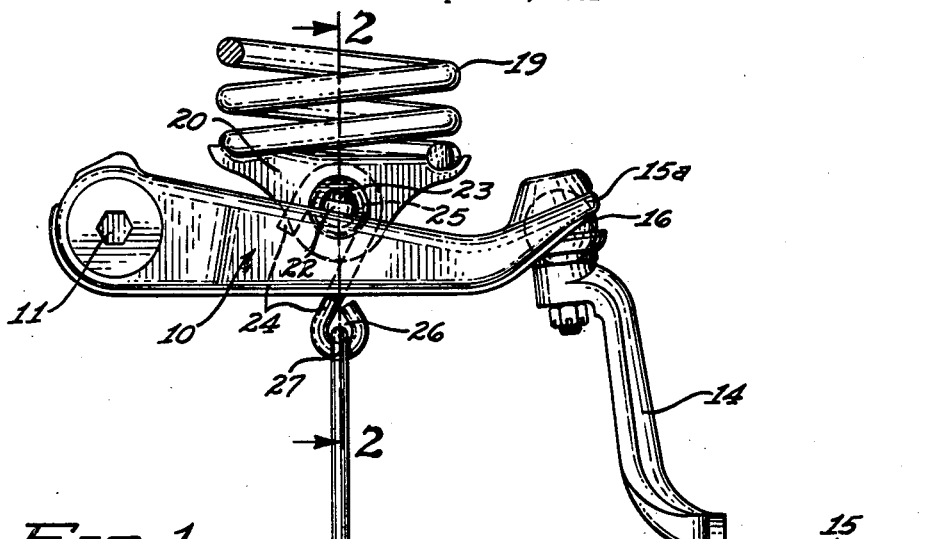
FIG. 1 is a view, partly broken away, of a stabilizer incorporating the features of this invention, applied to the ball joint suspension arms of an automotive front suspension.
Figure 2:
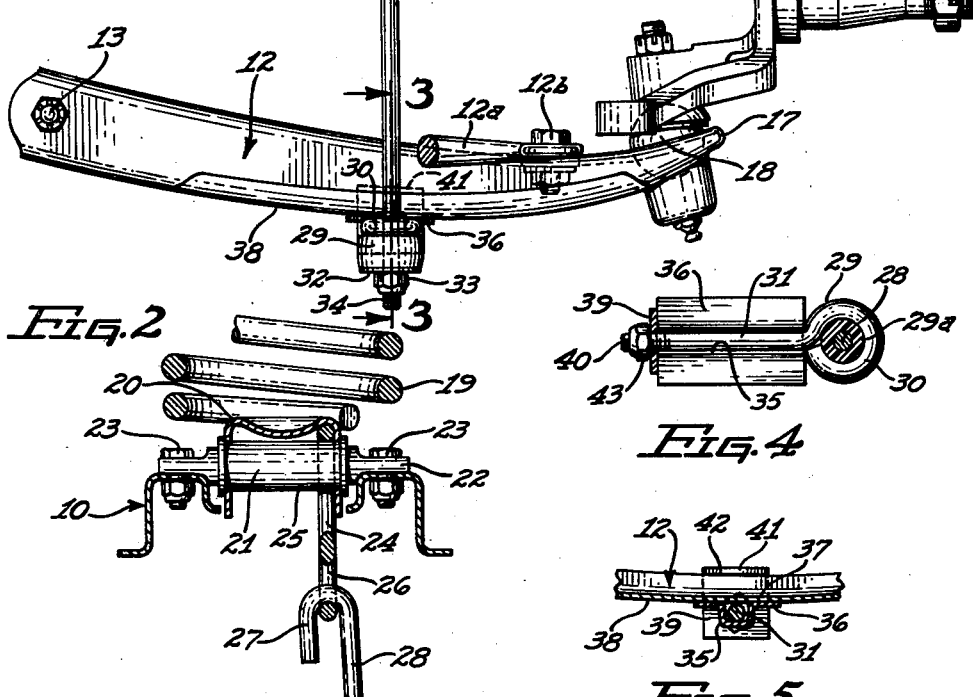
FIG. 2 is an enlarged fragmentary sectional view on the line 2—2 of FIG. 1.
Figure 4:
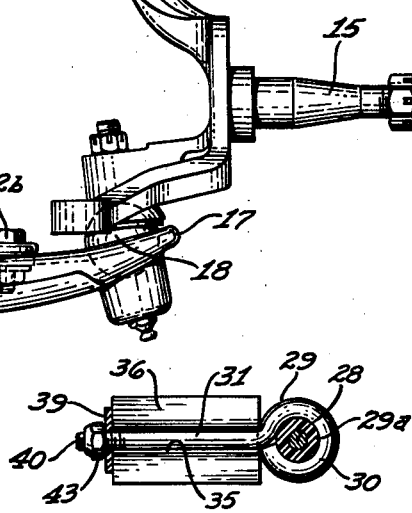
FIG. 4 is an enlarged sectional view on the line 4—4 of FIG. 3.
Figure 5:
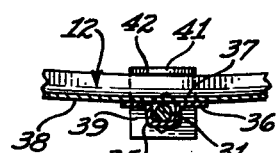
FIG. 5 is an enlarged section on the line 5—5 of FIG. 3.
Figure 3:
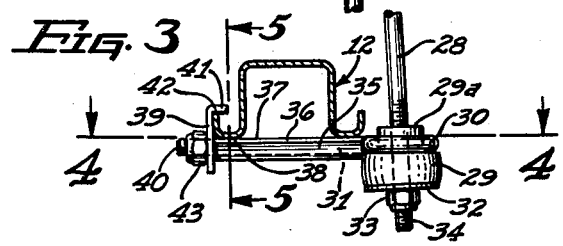
FIG. 3 is an enlarged fragmentary sectional view on the line 3—3 of FIG. 1.

As an example of one embodiment of this invention, there is shown an automotive front end suspension having an upper ball joint arm 10 which is pivotally mounted on a suitable rock bolt 11 on the frame (not shown) of the automotive vehicle. A lower ball joint arm 12 is likewise pivotaly mounted on the frame by a suitable rock bolt 13. The steering spindle forging 14 has the usual steering spindle 15 upon which is journaled the usual front wheel of the vehicle. The upper end of the steering spindle forging is loosely connected to the outer end 15a of the upper ball joint arm 10 by the usual upper ball joint 16 while the lower end of the forging 14 is connected to the outer end 17 of the lower ball joint arm 12 by the usual lower ball joint 18. The usual torsion bar 12a is secured to the lower arm 12 by bolts 12b and its other end connected to the frame (not shown) of the vehicle in a conventional manner.

The main suspension coil spring 19 for the frame of the vehicle is supported in the spring saddle 20 which has an integral cylindrical bearing member 21 which is pivotally journaled on the spring saddle pin 22 rigidly fixed to the upper ball joint arm 10 by suitable bolts 23. A conventional shock absorber (not shown) may be connected between the saddle 20 and the frame of the vehicle located inside of the coil spring 19 as required.

The stabilizer for the above described conventional automotive front end suspension system comprises a hook 24 which is placed over the outside peripheral surface 25 of the bearing member 21, the hook 24 having an eyelet 26 which receives the hooked end 27 of the tension rod 28 of the stabilizer. The lower end of the tension rod 28 passes down through a flexible plastic bushing 29 having a reduced upper end 29a extending up through the eye 30 of the eyebolt 31 and an abutment washer 32 backed up by a nut 33 carried on the threaded lower end 34 of the tension rod 28 provides the means for adjusting the tension in the stabilizer.

The shank of the eyebolt 31 is supported in the U-shaped channel piece 35 which is integrally formed with the abutment plate 36 having its top surface 37 in contact with the lower surfaces 38 of the lower ball joint arm 12. A clip piece 39 fits over the threaded end 40 of the eyebolt 31 and has a bent over lip 41 adapted to engage the upwardly facing lip 42 of the lower ball joint arm 12 when the back nut 43 is tightened against the clip piece 39 so as to secure the eyebolt 31 to the lower ball joint arm 12. Thus, the two ball joint arms are held in tension toward each other under all operating conditions of the vehicle so that the play and lost motion in the ball joints 16 and 18 is at all times taken up so as to eliminate rattle and misalignment of the steering geometry. It will further be noted that the line of tension of the stabilizer is centered with the point of relative rocking of the spring saddle 20 and the upper ball joint arm 10 so that no relative turning rotation of the bearing member 21 and the hook 24 occurs. Further, the hook 24 pulling down on the bearing member in the direction of force from the suspension spring 19 keeps play and rattle from between the saddle 20 and pin 22 as these parts become worn. It will be understood that any suitable yielding tension medium may be used in the tension stabilizer linkage to perform the function of the resilient bushing 29 shown in this example.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A stabilizer for an automotive front suspension system comprising in combination:

a. an upper ball joint arm pivotally mounted at its inner end on the automotive frame, b. a lower ball joint arm pivotally mounted at its inner end on the automotive frame,
c. a steering spindle member located between the outer ends of said arms,
d. ball joint connections between said steering spindle member and the outer ends of said arms,
e. a tension member connected between an intermediate point of each of said arms to yieldingly move the outer ends of said arms toward each other to maintain backlash free connection of said spindle member in said ball joints at the outer ends of said arms,
f. said tension member including a hook adapted to engage around the pivot axis of a spring saddle on said upper arm,
g. a tension rod connected to said hook,
h. an eyebolt fixed to the underside of said lower arm having,
i. an eyelet to one side of said lower arm,
j. and a resilient connection between the lower end of said tension rod and the eyelet of said eyebolt.

2. A stabilizer for an automotive front suspension system comprising in combination:
a. an upper ball joint arm pivotally mounted at its inner end on the automotive frame,
b. a lower ball joint arm pivotally mounted at its inner end on the automotive frame,
c. a steering spindle member located between the outer ends of said arms,
d. ball joint connections between said steering spindle member and the outer ends of said arms,
e. a tension member connected between an intermediate point of each of said arms to yieldingly move the outer ends of said arms toward each other to maintain backlash free connection of said spindle member in said ball joints at the outer ends of said arms,
f. said tension member including a hook adapted to engage around the pivot axis of a spring saddle on said upper arm,
g. a tension rod connected to said hook,
h. an eyebolt fixed to the underside of said lower arm having,
i. an eyelet to one side of said lower arm,
j. a resilient connection between the lower end of said tension rod and the eyelet of said eyebolt,
k. said eyelet of said eyebolt being located on the opposite side of said lower arm from a torsion bar connected to said lower arm.

References Cited in the file of this patent
UNITED STATES PATENTS

| | | |
|---|---|---|
| 2,153,168 | Broadman | Apr. 4, 1939 |
| 2,403,145 | Ulrich | July 2, 1946 |
| 2,510,406 | Lucas | June 6, 1951 |
| 2,627,404 | Beason | Feb. 3, 1953 |
| 2,707,100 | Schilberg | Apr. 26, 1955 |
| 2,756,067 | Porsche et al. | July 24, 1956 |
| 2,771,301 | Booth et al. | Nov. 20, 1956 |
| 2,822,185 | Mineck | Feb. 4, 1958 |
| 2,866,651 | Powell | Dec. 30, 1958 |
| 2,961,253 | Allison | Nov. 22, 1960 |
| 2,973,953 | Fikse | Mar. 7, 1961 |